July 4, 1933. M. H. TONCRAY ET AL 1,916,346

VEHICLE SEAT

Filed Nov. 3, 1928 3 Sheets-Sheet 1

Inventors:
Millard H. Toncray
James W. Greig
By Macleod, Calver, Copeland & Dike
Attorneys.

July 4, 1933.  M. H. TONCRAY ET AL  1,916,346

VEHICLE SEAT

Filed Nov. 3, 1928    3 Sheets-Sheet 2

Inventors:
Millard H. Toncray
James W. Greig
By Macleod, Calver, Copeland & Dike
Attorneys.

Inventors:
Millard H. Toncray
James W. Greig
By Macleod, Calver, Copeland & Dike
Attorneys.

Patented July 4, 1933

1,916,346

UNITED STATES PATENT OFFICE

MILLARD H. TONCRAY, OF DETROIT, AND JAMES W. GREIG, OF GROSSE POINTE PARK, MICHIGAN, ASSIGNORS TO HUDSON MOTOR CAR COMPANY, OF DETROIT, MICHIGAN, A CORPORATION OF MICHIGAN

VEHICLE SEAT

Application filed November 3, 1928. Serial No. 316,979.

This invention relates to seats for automobile bodies, and especially to front seats for use in closed bodies, either of the sedan type employing the so-called bench seat or the coach type employing individual front seats for driver and passenger.

An object of the invention is to provide a seat supported in an improved manner so as to permit adjustment of the seat longitudinally of the vehicle. The invention provides an improved construction in which the seat may be readily and easily adjusted forwardly from its normal rearmost position. The invention also provides an improved adjustable seat construction in which the seat may be elevated as it is adjusted forwardly, thus enabling a driver of short stature not only to reach with his feet the control pedals but also to provide better vision over the steering wheel.

Other objects of this invention will appear in the following description and appended claims, reference being had to the accompanying drawings forming a part of this specification wherein like reference characters designate corresponding parts in the several views.

Before explaining in detail the present invention, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended as considered in view of the prior art and the requirements thereof.

This application is a continuation in part of our copending application, Serial No. 196,369, filed June 3, 1927.

Figure 1:
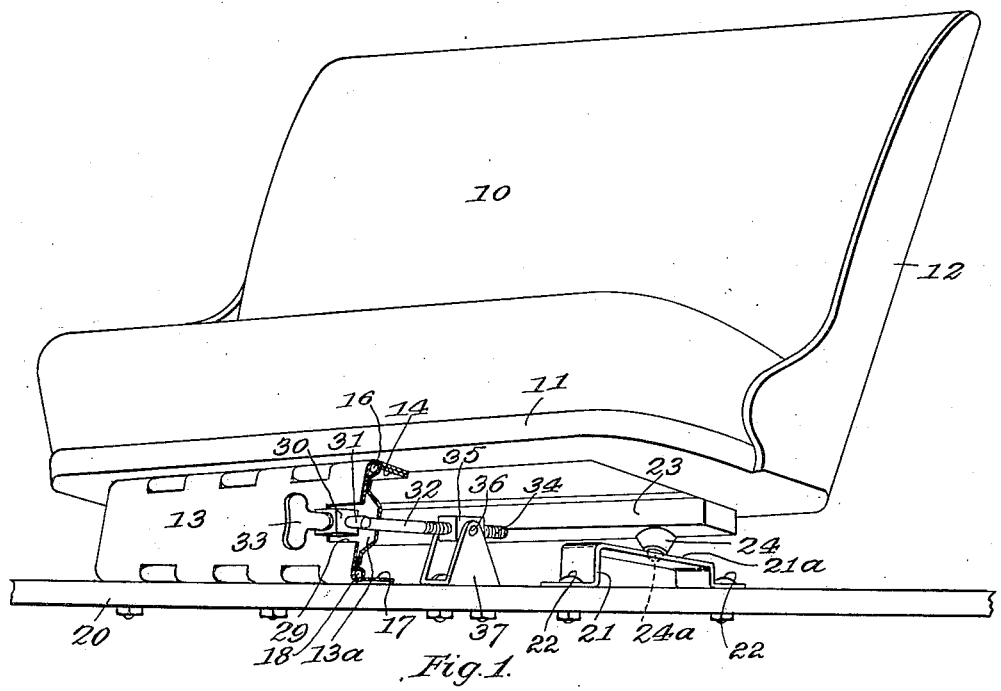
Fig. 1 is a perspective view illustrating the invention as applied to a sedan seat, the supporting hinge being broken away midway to show other parts.
Figure 2:
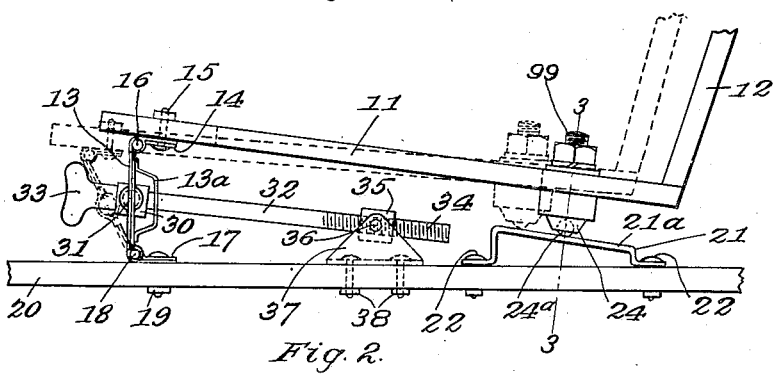
Fig. 2 is a fragmentary side elevation, showing the supporting and operating mechanism for the seat.
Figures 3, 4, 5:
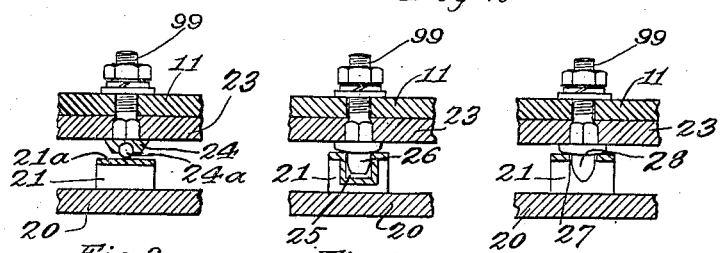
Fig. 3 is a detail section taken on line 3—3, Fig. 2.
Figs. 4 and 5 are somewhat similar views showing modifications.
Figure 7:
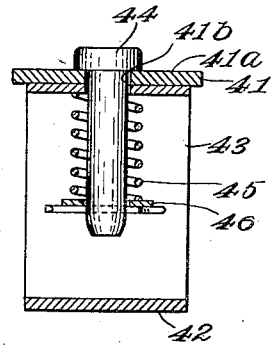
Fig. 7 is an enlarged section taken substantially on line 7—7, Fig. 6.

Referring to Figs. 1 to 3 inclusive, we have illustrated at 10 a conventional sedan seat which may comprise a base frame 11 and back 12 to which the usual cushions are attached. The seat is supported at the front part thereof by means of an upright swinging hinge member or plate 13 which preferably extends beneath the frame 11 transversely of the seat the major part of the width of the seat. The supporting member 13 is preferably boxed at 13a to provide strength and rigidity to the support. A complemental hinge member 14 is bolted at 15 to the bottom of the seat frame 11 and the hinge parts 13 and 14 are hinged together by a longitudinally extending pintle 16. This construction provides a hinge of the piano type affording considerable supporting strength. A second complemental hinge member 17 is bolted at 19 to the floor 20 of the vehicle body and is in like manner hinged to the lower edge of the member 13 by means of a longitudinally extending pintle pin 18. From this construction it will be seen that the forward part of the seat is swingingly supported through the medium of the hinge members 13, 14 and 17. The member 13 provides a swinging support for the front edge of the seat upon which the latter is movable forwardly and rearwardly through a dead centre position, the latter position being shown in full lines in Fig. 2.

In the construction shown in Figs. 1 to 5 inclusive the rear part of the seat is supported in its various adjusted positions by means of rails or guide bars 21. Two of these are provided in the present instance one at each side of the seat although if desired an additional intermediate support may be provided. The bar 21 is bent or stamped to provide flanges which may be bolted at 22 to the floor of the vehicle. The central part of the supporting bar 21 is constructed so as to provide a forwardly and upwardly extending working or contacting face 21a. Secured to the bottom of the seat adjacent the rear edge thereof is a transverse bar 23. Bolted to the bottom of this bar are a plurality of lugs or knobs 24 carrying balls 24a, or other suitable devices such as rollers, capable of sliding readily and with a minimum of friction on the face of the rail 21a.

As illustrated in Fig. 4 the bar 21 may be provided with a longitudinal groove or channel 25 within which travels the projecting guide pin or stud 26, or as shown in Fig. 5 the rail 21a may be provided with a longitudinal slot 27 within which slides the projecting stud 28. Each of the studs 24, 26 and 28 are bolted at 99 to the cross bar 23 and to the seat frame 11. The construction in Figs. 4 and 5 enables the rear part of the seat to slide forwardly and rearwardly on the rail 21a while at the same time supporting and guiding the rear part of the seat against lateral movement or displacement. Each of the constructions shown in Figs. 3, 4 and 5 enable the seat to be lifted and swung forwardly about the axis 16 to permit access, for instance, to the battery beneath the floor boards.

In the present instance we have provided operating mechanism by means of which the seat may be positively moved forwardly or rearwardly. The hinge member 13, 13a is provided centrally thereof with a slot or opening 29 within which is mounted a bushing or block 30. This bushing 30 is pivoted or swivelled on a pin 31 secured at opposite ends to the hinge plate 13. The bushing 30 is drilled to receive a threaded rod 32. The front end of this rod extends through the hinged bushing 30 located in the face of the hinge plate 13, and fastened to the front end is a thumb piece or handle 33 located in front of the member 13 in convenient position to be grasped by the passenger or operator. The rod 32 is freely rotatable within the bushing 30 and extends rearwardly beneath the seat. The end of this rod is threaded at 34 and extends through a tapped bushing or nut 35 which in turn is swivelled on a pin 36 carried by the spaced upstanding ears of a bracket 37 bolted at 38 to the floor.

It will be seen from the foregoing that the seat 10 is supported at the front part thereof by means of the swinging hinge member 13 and is supported at the rear part thereof by means of the inclined rails 21a at opposite sides thereof. From its rearmost position the front of the seat when adjusted will move forwardly and upwardly as far as the dead centre position of the member 13 and when further adjusted will swing through this dead centre position to the position shown in dotted lines in Fig. 2. Thus in its extreme rear and front adjusted positions the front of the seat will be at the same height while it will be elevated somewhat as it is moved forwardly to the dead centre position. As the rear part of the seat moves forwardly from its extreme rearmost position, the members 24 will ride upwardly on the inclined rails or guides 21a thereby gradually raising the rear part of the seat. It will also be seen that the operating parts 32 and 35 provide practically a micrometer adjustment of the seat between the maximum and minium positions. By supporting the operating rod 32 through the medium of the swivelled bushing 30 on the swinging hinge member 13, it will be seen that any longitudinal movement of the rod when transmitted to the seat will be multiplied. If, for example, the rod is supported on the bushing 30 in the up and down centre of the hinge, the seat will move twice as fast as the rod.

Figure 6:
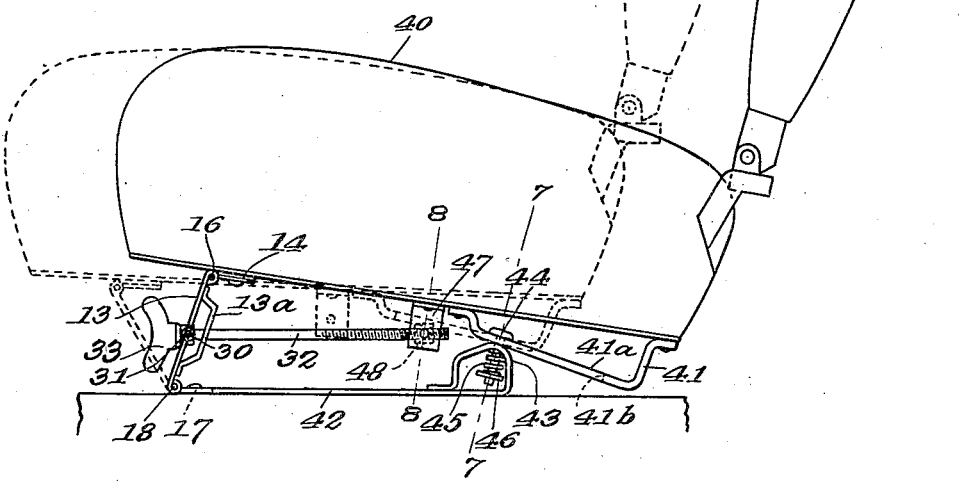
Fig. 6 is a side elevation illustrating the invention as applied to a coach seat.
Figure 8:
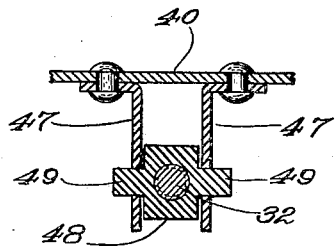
Fig. 8 is an enlarged section taken substantially on line 8—8, Fig. 6.

Referring to Fig. 6, it will be seen that the invention in this instance is applied to a coach seat 40 having the usual lazy back 40a. The front part of the seat is swingingly supported preferably in the same manner as described and shown above in connection with Figs. 1 and 2. In this instance the rear part of the seat is supported in a manner similar to that illustrated in connection with the sedan seat with the exception that the position of the supporting members is reversed. In this instance the bar 41 (corresponding to the bar 21 in Figs. 1 and 2) is secured to the bottom of the seat at each side thereof. This bar in like manner is provided with a forwardly and upwardly inclined guide or contact rail 41a. This rail contacts with and slides on a projecting member or button 43 bent up from a bar 42 mounted on the floor of the vehicle. This bar extends forwardly and is hinged to the hinge member 13 by means of the pintle pin 18. The rail 41a is preferably provided with a longitudinally extending slot 41b through which extends a stud 44 which passes through a hole in the member 43 and carries a compression spring 45 interposed between the under face of the member 43 and a washer 46 fixed to the end of the stud 44. This construction, together with the hinging of the bar 42 to its forward end is similar to that shown and described in our prior application above referred to, and permits the entire seat and bar 42 to be swung upwardly and forwardly about the pivot 18.

In the construction shown in Fig. 6, the operating rod 32 is in like manner supported by a swivelled bushing 30 carried by the front hinge member 13 as described above in connection with Figs. 1 and 2. The rear threaded end of the rod 32 in this instance is threaded into a nut or block 48 having trunnions 49 supported in angle brackets 47 secured to the bottom of the seat.

It will be seen that the operating rod 32 may cooperate with the threaded nut or bushing 35 which is secured to the floor as shown in Figs. 1 and 2; or it may cooperate with a nut 48 which is secured to the bottom of the seat as shown in Fig. 6. Furthermore the inclined contact rail 21a or 41a, by means of which the rear part of the seat is not only supported in all adjusted positions thereof but is also raised or lowered as the seat is moved forward or rearward, may be secured either to the bottom of the seat or to the floor beneath the seat.

Figure 9:
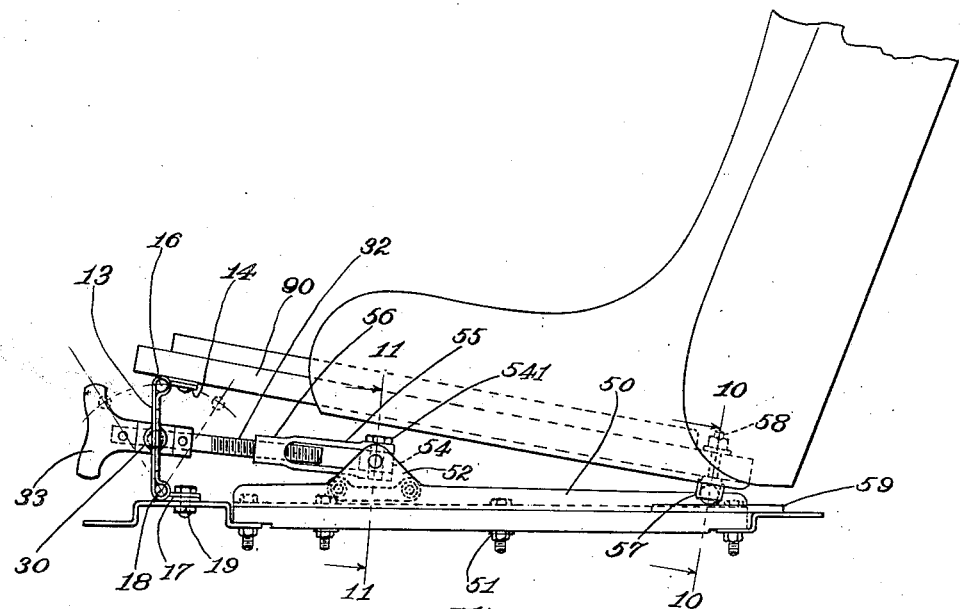
Fig. 9 is a side elevation illustrating a further modification of the invention.
Figure 10:
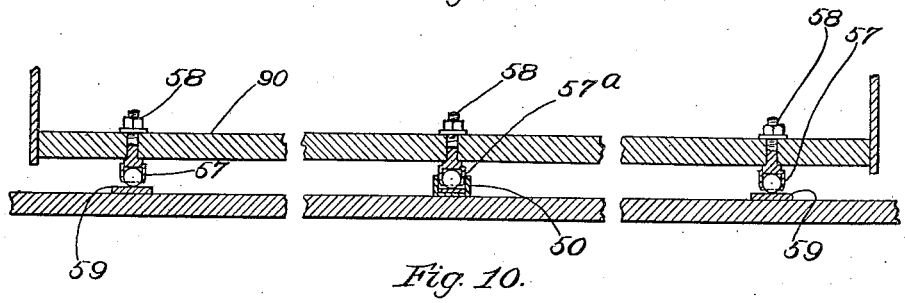
Fig. 10 is a transverse section taken on line 10—10, Fig. 9.
Figure 11:
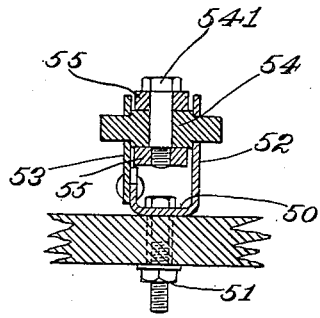
Fig. 11 is a section taken on line 11—11 of Fig. 9.

Referring to Figures 9, 10 and 11 the forward edge of the seat frame 90 is swingingly supported by means of the transverse hinge members 13, 14 and 17, the construction being substantially the same as described above. A channel 50 is bolted to the floor at 51 and extends in line with the operating rod 32. Adjacent its forward end one of the upstanding flanges of the channel is provided with a projecting ear 52, and a similar ear or plate 53 is riveted to the opposite flange. A block 54 is trunnioned in the upper ends of the ears 52, 53, and bolted at 541 to this block are a pair of arms 55 projecting from a sleeve 56. This sleeve is tapped to receive the threaded end of the operating rod 32.

The rear portion of the seat is supported at opposite sides by ball or roller bearing casters 57 bolted at 58 to the seat frame 90. These casters travel on horizontal plates or rails 59 bolted to the floor. An intermediate caster structure 57a, similar in construction, travels in the channel 50 the upright side flanges of which embrace the caster and guide it, thereby maintaining the seat against lateral displacement.

We claim:

1. In a vehicle body, a seat, a swinging support for one edge of said seat upon which the latter is movable forwardly and rearwardly through a dead centre position, means for supporting the opposite edge of the seat in various longitudinally adjusted positions of the seat, said means including a member secured to the seat and a member secured to the floor therebeneath, one of said members having a forwardly and upwardly extending surface slidably engaged by the other member, and an adjusting screw carried by said swinging support for moving said seat.

2. In a vehicle body, a seat, a swinging support for the front part of the seat, an inclined support for the rear part of the seat effective to raise or lower the same as the seat is moved forwardly or rearwardly, and an adjusting screw carried by said swinging support for moving the seat.

3. In a vehicle body, a seat, a swinging support for the front part of the seat, means for supporting the rear part of the seat to permit the seat to be moved forwardly or rearwardly, an adjusting screw swivelled on said swinging support, and a nut supported beneath the seat and cooperating with said screw.

4. In a vehicle body, a seat, a swinging support for the front part of the seat, a threaded rod pivotally mounted on said swinging support and extending rearwardly beneath the seat, and a nut threaded on said rod for operating the same.

5. In a vehicle body, a seat, an upright hinge member hinged to the floor and to the front part of the seat, means for slidingly supporting the rear part of the seat, a rotatable operating rod extending through said hinged member and pivoted thereto, and a nut mounted beneath the seat and threaded on the end of the rod whereby the rod may be rotated for moving the seat forwardly and backwardly.

6. In a vehicle body, a seat, an upright hinged device for supporting one part of the seat, and an adjusting screw extending through said device and engaging the same for swinging the seat on said device.

7. In a vehicle body, a seat, separate supports for the front and rear portions of the seat for supporting the seat upon the floor of the body and permitting the seat to move forwardly or rearwardly, one of said supports comprising a link pivotally connected at one end to the floor and at its other end to the seat, a member positioned so as to have a fixed relation to one end of said link, and an adjusting screw connecting said member and link at a point spaced from said end of the link and adapted to move the seat longitudinally of the body.

8. In a vehicle body, a seat, separate supports for the front and rear portions of the seat for supporting the seat upon the floor of the body and permitting the seat to move forwardly or rearwardly, one of said supports comprising a link pivotally connected at one end to the floor and at its other end to the seat, a stationary member on the floor, and an adjusting screw operatively connecting said member and link adapted to move the seat longitudinally of the body.

9. In a vehicle body, a seat, separate supports for the rear and front portions of the seat for supporting the seat upon the floor of the body and permitting the seat to move forwardly or rearwardly, the support for the front portion comprising a link pivotally connected at one end to the floor and at its other end to the seat, the support for the rear portion including an inclined guide permitting the rear portion to move in a vertical direction as the seat is moved forwardly or rearwardly, a member positioned so as to have a fixed relation at one end of said link, and an adjusting screw connecting said member and link at a point spaced from said end of the link and adapted to move the seat longitudinally of the body.

In testimony whereof we affix our signatures.

MILLARD H. TONCRAY.
JAMES W. GREIG.